Figure 1:
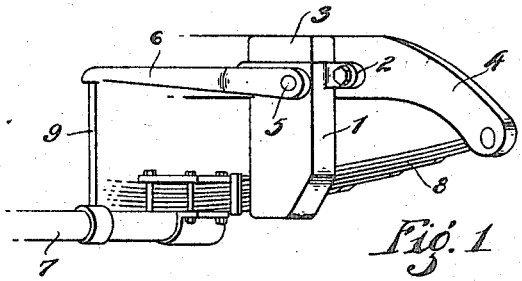

Nov. 18, 1924.

J. B. KIRBY 1,515,863

SHOCK ABSORBER

Filed April 7, 1920

Inventor.
James B. Kirby
By Hull Smith Brock & West
Att'ys.

Patented Nov. 18, 1924.

1,515,863

UNITED STATES PATENT OFFICE.

JAMES B. KIRBY, OF CLEVELAND, OHIO.

SHOCK ABSORBER.

Application filed April 7, 1920. Serial No. 371,789.

*To all whom it may concern:*

Be it known that I, JAMES B. KIRBY, a citizen of the United States, residing at Cleveland, in the county of Cuyahoga and State of Ohio, have invented a certain new and useful Improvement in Shock Absorbers, of which the following is a full, clear, and exact description, reference being had to the accompanying drawings.
This invention relates to that class of device employed for restraining the excessively violent movements of vehicle springs, especially those of automobiles, thereby rendering the movement of the vehicle body more comfortable and decreasing the danger of breaking the springs. These devices have received the somewhat inaccurate but well understood name of "shock absorbers".

The main object of the invention is the provision of a device of this character wherein the restraining movement shall depend only upon the transmission of a shock or jar to the body of the vehicle and wherein the amount of restraint shall be proportional to the violence of that shock or jar. Other objects of the invention are the provision of a device of this character which shall be extremely simple, compact, of few parts and easily attached to the machine;
the provision of a shock absorber which shall offer the same character of action at all times regardless of the initial weight carried by the vehicle, which shall be totally inactive at all times excepting when the body itself shall have received jolts of a predetermined degree of magnitude; while further objects and advantages of the invention will become apparent as the description proceeds.
It is of the utmost importance that the free movement of the axle relatively to the body be impeded as little as possible in order that the vehicle wheels may follow accurately the contour of the road. Any construction which prevents this clearly accelerates tire wear and decreases the effective performance of the engine; thus, for example, a frictional device which operates to resist the elevation of the axle necessitates that at each bump in the road the engine shall do unnecessary work in compressing the tire and also in elevating the vehicle body against such resistance before the wheel can pass the same; while any opposition to the free falling movement of the axle always tends to prevent the tire from dropping into hollows in the roadway or from returning to the surface after having been elevated, with the result that the engine will momentarily speed up that wheel beyond the velocity of the car with consequent serious injury to the tire when it finally drops back into contact with the paved surface. The essence of my invention consists in basing the operation of my shock absorber entirely upon the absolute movement of the vehicle body in space regardless of any relative movements which may occur between the body and wheels; and this I do by means of the principle of inertia, providing for the purpose a mass flexibly supported relatively to the body in such wise that when the body becomes displaced relatively to that mass, a retarding force is produced whose direction and magnitude depend upon the direction and magnitude of such body movement.

Figure 2:
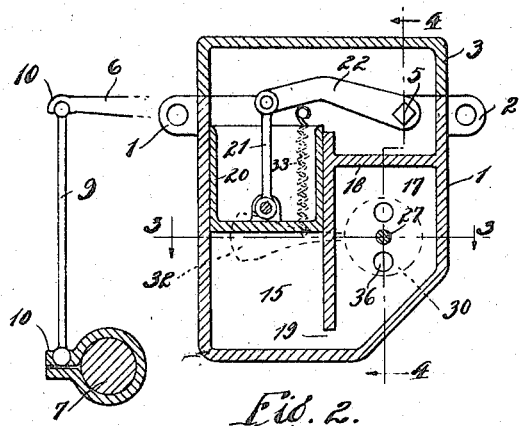
Figure 3:
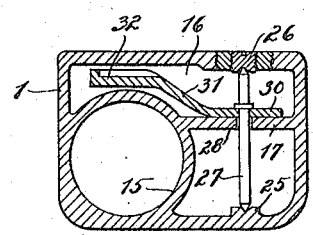
Figure 4:
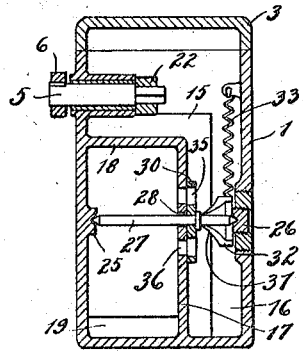
Figure 5:
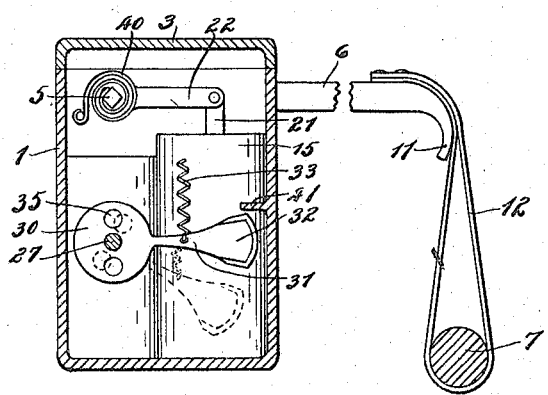

In the drawings accompanying and forming a part of this application I have shown a preferred embodiment of my invention together with its mode of application to a frame and axle part of an automobile, although it will be understood that a great many changes can be made in the details of construction and that the device is equally applicable to both the axles of an automobile. In these drawings Fig. 1 is a perspective view of my improved shock absorber showing one mode of attachment; Fig. 2 is a vertical sectional view of the same; Fig. 3 is a horizontal sectional view corresponding to the line 3—3 of Fig. 2; Fig. 4 is a sectional view corresponding to the line 4—4 of Fig. 2; and Fig. 5 is a vertical sectional view of the rearward interior part of a slightly modified form of shock absorber.

Describing by reference characters the parts shown in these drawings 1 represents a hollow metal casing having suitable attaching ears 2—2 and a removable top 3, the rearward face of the casing being made flat to facilitate its attachment to a suitable part of the automobile body such as the spring hanger 4. Journaled transversely of the upper part of this casing is a horizontal rock shaft 5 carrying an arm 6 whose outer end is connected to the axle 7 which carries said hanger 4 through the instrumentality of the usual spring 8. In Fig. 1 this arm is connected to the axle by means of a rigid link 9 having ball joints 10—10 at its ends so that universal movement may exist. In Fig. 5 the end of the arm is formed with a curved part 11 to which is attached the flexible strap 12 which surrounds the axle. As a consequence the structure in Figs. 1 and 2 is capable of restraining downward movements of the body to some extent, as well as upward movements, while that in Fig. 5 is capable only of restraining upward movements of the same.

One side of the casing contains the vertical cylinder 15 past which extends the narrow well 16, the side of said well being completed by a vertical partition 17 which extends from the cylinder wall to the opposite wall of the casing. The upper end of said partition merges with a horizontal partition 18 which extends laterally in the opposite direction from said well, thus defining a closed chamber which communicates freely with the cylinder interior by means of an open port 19. Mounted in the cylinder is the reciprocable piston 20 connected by the piston rod 21 to one end of the operating arm 22 whose opposite end is rigidly connected to the rock shaft 5.

Communication is effected between the well and chamber by means of a valve operated by an inertia-weight, and while a great many different devices can be employed for the purpose the simplest which I have yet conceived, both in practice and for purposes of illustration, is as follows: the forward wall of the casing is formed with a thickened boss 25 and the rearward wall is provided with a movable screw plug 26 said boss and plug having recesses in their opposed faces in which are pivoted the ends of a horizontal shaft 27 which passes freely through a hole 28 in the wall 17. Carried by this shaft is a flat circular disc 30 to which is attached the laterally extending arm 31 whose free end is thickened or otherwise weighted as shown at 32. Secured to this arm is a sensitive spring 33 here shown as a helical spring whose upper end is suitably attached to the casing interior and whose strength is just sufficient to hold the arm horizontally when the parts are at rest. The disc 30 is also formed with suitable apertures 35 which register with other apertures 36 formed in the partition 17 when this horizontal position exists.

With this construction it will be seen that so long as the vehicle body has no upward or downward movement more rapid than a predetermined minimum speed, the ports 36 will remain open and the piston 20 can reciprocate substantially without opposition; but upon any sudden upward movement of the frame the tendency of the weight 32 will be to lag behind, thereby closing the ports 36 to a greater or less extent depending upon the violence of the blow and thereby restraining the upward movement of the body relatively to the axle. Likewise upon a sudden downward movement of the body the weight 32 will tend to be left behind, similarly closing the ports 36 and restraining the downward movement of the body although the limit of this is only the atmospheric pressure, which with the ordinary size of piston and length of lever arms will amount only to about 20 pounds force at the point 10.

In case it be not desired to utilize the downward retardation feature, the arrangement shown in Fig. 5 may be adopted, a strap 12 being substituted for the rod 9. In this case it is necessary to employ a spring to draw the piston upwardly and maintain the strap 12 tight, and for this purpose I have here shown a coil spring 40 surrounding the shaft 5. Also in order to permit the free action of this spring it is desirable to prevent any retardation of the piston's upward movement such as would be caused by a movement of the weight 32 upwardly past horizontal, for which purpose I preferably form the casing with a rigid stop 41 at the point shown.

It will be understood that many changes in shape, design and arrangement of parts can be made within the scope of my invention and that I do not restrict myself to the arrangements herein shown except as the same are specifically recited in the claims hereto annexed.

Having thus described my invention, what I claim is:

1. In a device of the character described, in combination, a fluid-containing casing adapted to be attached to one part of an automobile and having therein a well and a cylinder, a plunger in said cylinder and operatively connected to a relatively movable part of the automobile, means establishing communication between said cylinder and well, and means for restricting the flow of fluid through such communicating means by an amount which varies directly with the acceleration of vertical movement of said body.

2. In a device of the character described, in combination, a fluid containing casing adapted to be attached to one part of an automobile and having therein a well and a cylinder, a plunger in said cylinder and operatively connected to a relatively movable part of the automobile, valve means establishing communication between said cylinder and well, a vertically movable weight, a sensitive spring supporting said weight, and connections between said weight and said valve means adapted to maintain said valve open while said weight is in normal position and to close said valve means by an amount proportional to the displacement of said weight from normal position.

3. In a device of the character described, in combination, a fluid-containing casing having a chamber, a well and a cylinder therein, means for attaching said casing to the body of a vehicle, a plunger in said cylinder, means for operatively connecting said plunger to one of the axles of said automobile in such wise that the plunger will be moved into or out of said cylinder upon relative vertical movement of said body and axle, a vertically movable mass in said well, a sensitive spring normally supporting said mass, the wall of said chamber having a port therein which communicates with the interior of said well, and a valve member operatively connected to said mass and cooperating with said port to close the same when the said mass is displaced from its normal position.

4. A shock absorber for vehicles comprising a hollow casing adapted to be attached to the vehicle body and having therein an upright cylinder open at its upper end and spaced from the top of the casing, said cylinder being also spaced from the end wall and from one side wall of said casing, an upright web connecting the wall of said cylinder with the end wall of the casing and defining a well and a chamber, said chamber being closed at its upper end by a horizontal web and having at its lower end a port which communicates with the cylinder interior, a horizontal rock-shaft traversing said first web intermediate of its height, a valve disc carried by said rock-shaft, a weighted arm projecting laterally from said disc, a sensitive spring supporting said arm, said disc and web being formed with ports which register when said arm is in normal position, a piston in said cylinder and means whereby said piston may be operatively connected to the axle of the vehicle.

5. In a device of the character described in combination a chambered part and a plunger part therein, one of said parts adapted to be attached to the body of a vehicle and the other to the axle of said vehicle, so that said parts will reciprocate relatively to each other upon relative vertical movement of said body and axle, a vertically movable weight, a sensitive spring attached to a part of said body and supporting said weight, one of said parts having a port which communicates with the chamber interior, and a valve member operatively connected to said weight and cooperating with said port to close the same when the said weight is displaced from its normal position.

In testimony whereof, I hereunto affix my signature.

JAMES B. KIRBY.